June 23, 1959

N. E. BERKE ET AL 2,891,720

DIGITAL GRAPH READER

Filed Jan. 11, 1956

NICHOLAS E. BERKE,
DAVID S. FOX,
DONALD D. WILLIAMS,
INVENTORS

BY Henry Huyman
ATTORNEY

June 23, 1959  N. E. BERKE ET AL  2,891,720
DIGITAL GRAPH READER
Filed Jan. 11, 1956  3 Sheets-Sheet 2

NICHOLAS E. BERKE,
DAVID S. FOX,
DONALD D. WILLIAMS,
INVENTORS

BY Henry Hyman
ATTORNEY

June 23, 1959     N. E. BERKE ET AL     2,891,720
DIGITAL GRAPH READER
Filed Jan. 11, 1956     3 Sheets-Sheet 3

NICHOLAS E. BERKE,
DAVID S. FOX,
DONALD D. WILLIAMS,
INVENTORS

BY Henry Hegman
ATTORNEY

United States Patent Office 2,891,720
Patented June 23, 1959

2,891,720
DIGITAL GRAPH READER

Nicholas E. Berke, Lawndale, and Donald D. Williams and David S. Fox, Los Angeles, Calif., assignors to Hughes Aircraft Company, Culver City, Calif., a corporation of Delaware Application January 11, 1956, Serial No. 558,492

7 Claims. (Cl. 235—61.6)

This invention relates generally to curve or graph reading apparatus, and more particularly to a graph reader which produces a digital output representative of the ordinate of a curve or of a function thereof.

Apparatus for integrating the area under a curve or for photoelectrically following a curve are well known. However, it is often necessary or desirable to produce a digital representation of the analog value of a curve at any desired abscissa by means other than the laborious manual taking of data from a curve.

It is therefore an object of this invention to provide an apparatus which produces a digital output signal representative of the ordinate or a function thereof of a curve.

It is another object of this invention to provide an apparatus which will photoelectrically translate to a digital representation the ordinate or a function thereof of a curve at any desired abscissa.

It is a further object of this invention to provide a graph reading apparatus which will translate a curve into a digital representation according to a predetermined linear logarithmic or other scale inherently providing a high degree of accuracy.

The present invention provides apparatus for producing a digital representation of the ordinate of a curve disposed on a graph plotted with respect to an abscissa. Included in the apparatus of the present invention are two sources of illumination, one of which is periodically interrupted and the other of which is interrupted once upon being absorbed by a portion of the opaque curve to be represented. The light rays so produced are converted into electrical signals, which signals are then compared and counted electronically. Thus a digital value corresponding to a particular point on the curve is produced.

The novel features which are believed to be characteristic of the invention, both as to its organization and method of operation, together with further objects and advantages thereof, will be better understood from the following description considered in connection with the accompanying drawings in which the invention is illustrated by way of example. It is to be expressly understood, however, that the drawings are for the purposes of illustration and description only, and are not intended as a definition of the limits of the invention.

Figure 1:
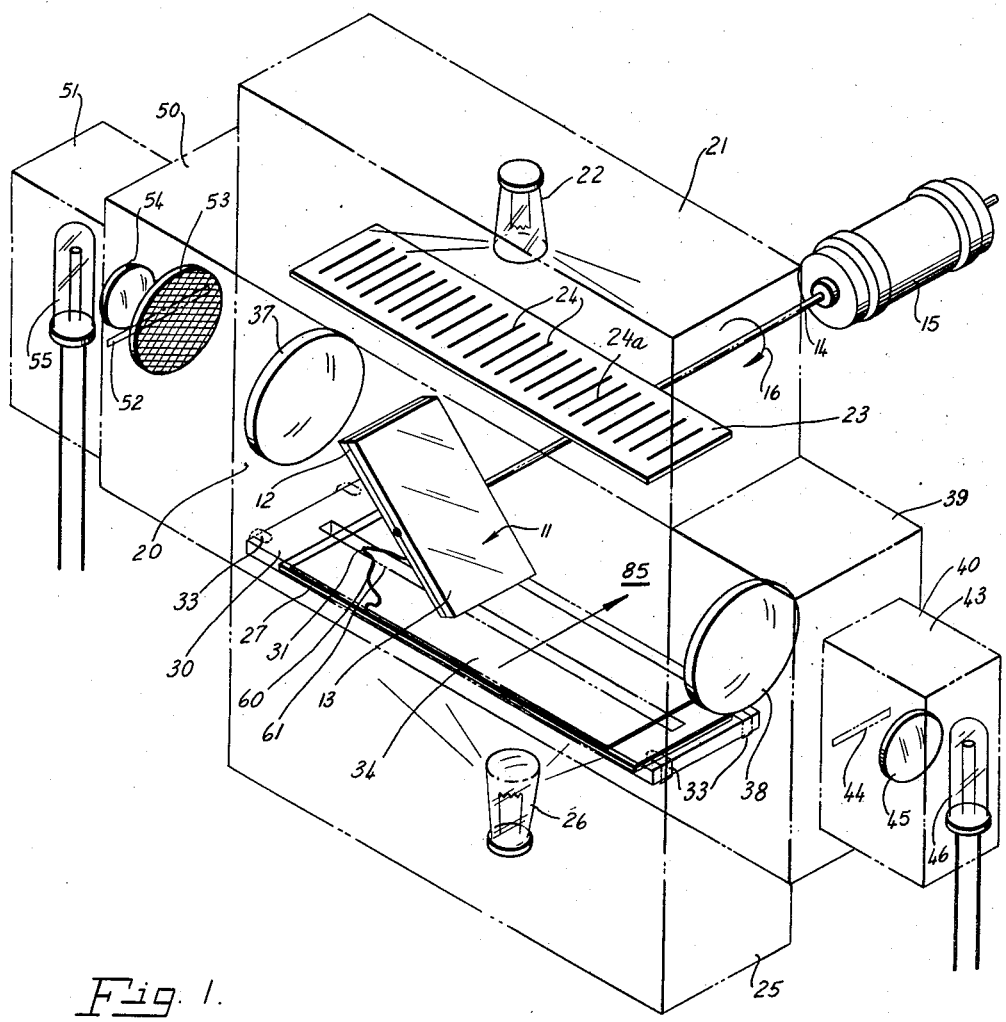
Fig. 1 is an isometric view of one embodiment of the apparatus of the present invention.

Referring now to the drawings, there is shown in Fig. 1 one embodiment of the apparatus of the present invention. Fig. 1 illustrates a mirror assembly 11 which comprises two separate mirrors 12 and 13 joined back to back, each being substantially identical to the other. The mirror assembly 11 is supported at its center and symmetrically disposed about shaft 14. Motor 15 rotates mirror assembly 11 by means of shaft 14 at a relatively slow and substantially uniform velocity in the direction indicated by arrow 16. A black box 20, shown in phantom, completely encloses mirror assembly 11 so that no ambient light can impinge upon either of mirror surfaces 12 or 13. Atop box 20 is another black box 21 which houses a light source 22 connected to a source of voltage not shown. Between the two boxes 20 and 21 is a frosted glass member 23 which fits into an opening (not shown) provided in the bottom side of box 21. A series of accurately-spaced, thin, opaque lines 24 is disposed upon a surface of member 23.

Below and adjacent to box 20 is another box 25 which also houses a light source 26 which light source is energized by a source of voltage not shown. A second frosted glass member 27 is disposed between boxes 20 and 25 at the intersurface between them. Frosted glass member 27 is secured in an aperture between these boxes. An opaque shield member 30, shown in phantom, is arranged to fit over and completely cover glass member 27. This shield has an aperture in the form of a slot 61 running parallel to the axis of the ordinates of a graph. Further, shield 30 is provided with spring clips 33 to hold the shield fast against graph paper 34 and to further force graph paper 34 against glass member 27.

Supported within two oppositely disposed apertures in box 20 are convex lenses 37 and 38. Attached to the right-hand side of box 20 is another black box 39, and another black box 40 is attached to the right of box 39. Between boxes 39 and 40 is a narrow horizontal slit 44. An image of the scale 23, 24 is formed in the plane of the slit 44 by means of lens 38. Directly behind slit 44 is field lens 45 which condenses the light passing through slit 44 on photocell 46.

Attached to the left-hand side of box 20 is another black box 50, behind which is still another black box 51. A second, narrow, horizontal slit 52 is provided between boxes 50 and 51. Lens 37 forms an image of the curve 60 in the plane of slit 52. Field lens 54 condenses light passing through slit 52 on a second photocell 55. Behind slit 52 is a filter 53 which absorbs light of the same color as the scale or grid, which may be provided on the graph, but does pass light of the color of the curve on the graph.

Figure 6:
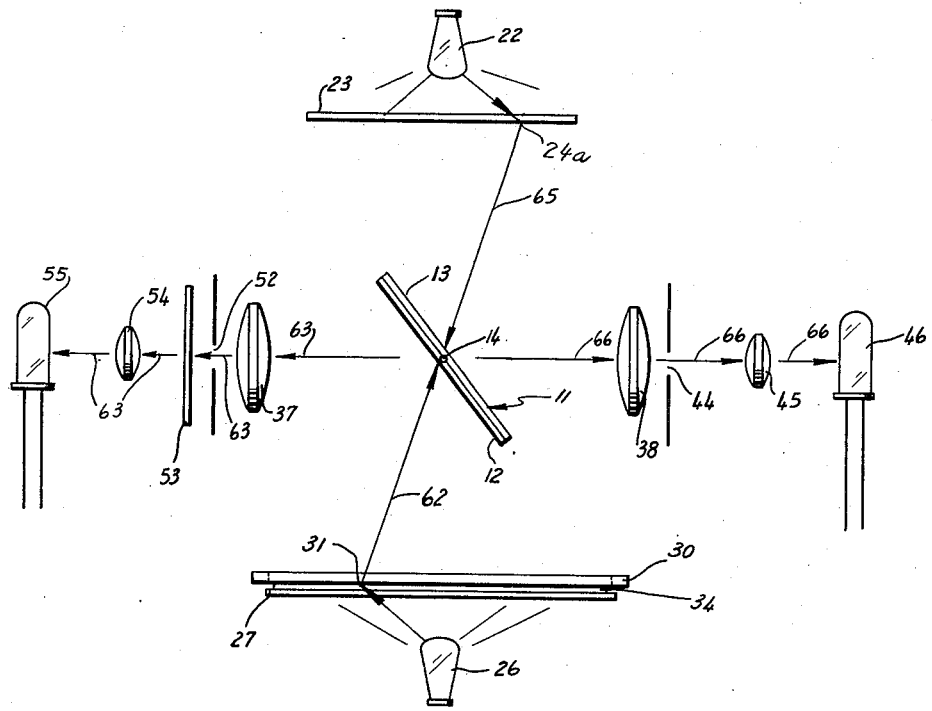
Fig. 6 is a schematic view showing the light paths at a particular point in the reading cycle to help facilitate an understanding of the apparatus of Fig. 1.

The operation of the apparatus of the present invention will now be explained. For the sake of simplicity the distances from the axis of the mirror through shaft 14, to the scale 23, 24 and the graph paper 34 will be considered equal. Further, it will be assumed that lenses 37 and 38 are equally spaced from the axis of shaft 14. Curve 60 on graph paper 34 may be seen through slotted aperture 61 in shield 30 at point 31. When rotating mirror assembly 11 is in the angular position shown in Fig. 6 an image of point 31 will be formed on slit 52 by lens 37, by reflection from mirror 12 as can be seen by tracing the light rays 62 and 63.

At this point in the reading cycle, the image of line 24a on the scale 23 is formed on the slit 44 by lens 38, as is seen by tracing light rays 65 and 66. From the symmetry of the arrangement, it can be seen that the distances of point 31 and line 24a from a vertical plane passing through the axis of shaft 14 are equal.

Figure 4:
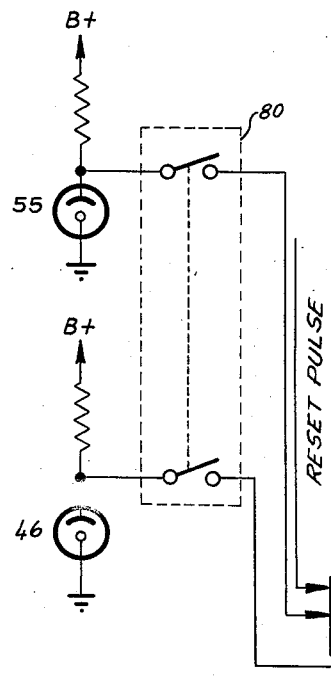
Fig. 4 is a circuit diagram of a portion of the electrical circuit of Fig. 3 showing details of its operation and its connection to the apparatus of Fig. 1.
Figure 5:
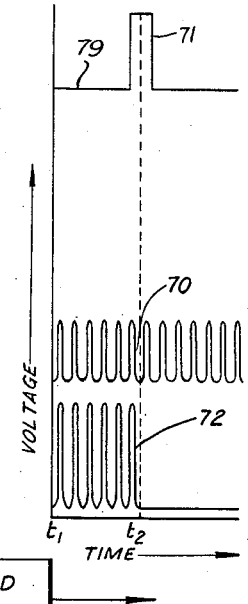
Fig. 5 is a graph showing the output waveforms at certain critical points in the apparatus of Fig. 1 and the circuit diagram of Figs. 3 and 4.

Attention is now directed to Fig. 4, which shows the two photocells 55 and 46, the waveforms generated thereby being illustrated in Fig. 5. Under ordinary operating conditions, as the mirror assembly 11 rotates, the lines 24 on glass 23 are scanned by the optical system consisting of mirror 13, lens 38, slit 44, and lens 45, producing a series of positive pulses 70 at the output of photocell 46 from the time $t_1$. Simultaneously, the portion of the graph paper 34 visible through slit 61 is scanned by the optical system consisting of mirror 12, lens 37, slit 52, filter 53, and lens 54. Because of filter 53, the output of photocell 55 is unaffected by any grid lines on graph paper 34. When the point 31 on graph 60 is reached by the light beam, the image of the point 31 is formed on slit 52 and a positive pulse 71 is produced at the output of photocell 55 herein. Pulse 71 occurs at time $t_2$.

Figure 3:
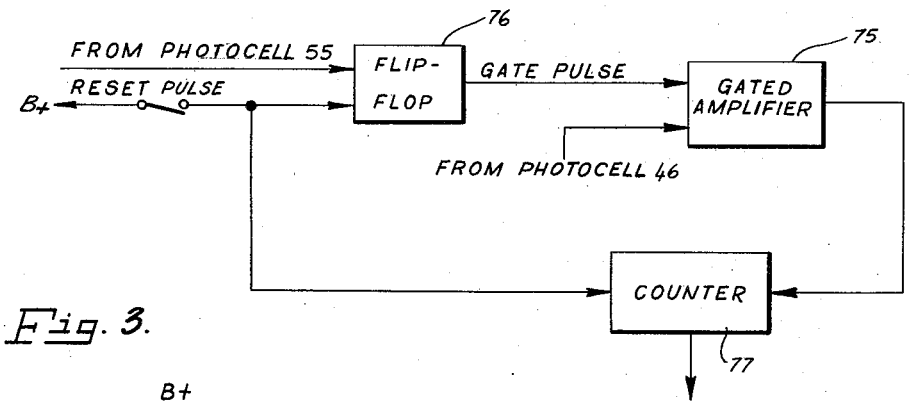
Fig. 3 is a schematic circuit diagram used in connection with the apparatus of Fig. 1 to produce a digital output.

Reference is now made to Fig. 3. It will be seen that photocell 46 has its output terminal connected to the input of gated amplifier 75. Further, photocell 55 has its output terminal connected to the input of flip-flop 76 which may be a standard Eccles-Jordan circuit. From time $t_1$ corresponding to a reset pulse to be discussed hereinafter, until time $t_2$ when point 31 on the curve is scanned, the series of positive pulses 70 from photocell 46 will be amplified by and passed through gated amplifier 75, generating a pulse train 72 shown in Fig. 5. At time $t_2$ the positive going pulse 71 will trigger the flip-flop 76 which produces an output signal or gate pulse which will cut off amplifier 75. The number of pulses 70, passing through and amplified by gated amplifier 75 and producing pulse train 72 will be counted by counter 77 thus giving a digital value to the ordinate of point 31 on curve 60. Counter 77 may be any type of electronic counter known to the art.

Figure 2:
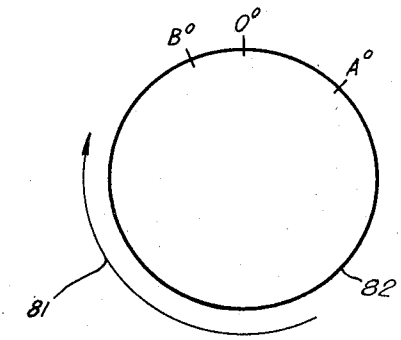
Fig. 2 is a graphical representation of a cam showing the time relationship of various elements of the Fig. 1 apparatus.

A switch 80 shown schematically in Fig. 4 connects the photocells 46 and 55 to the gated amplifier 75 and a flip-flop 76 respectively in accordance with the rotational position of the shaft 14 of the motor 15 as will be explained. A reset pulse switch 78 also controlled by the shaft 14 and shown schematically in Fig. 3 is utilized to apply a positive potential designated by B+ momentarily to the flip-flop 76 and the counter 77 before the beginning of each period of scanning. This reset pulse is applied to and resets the counter 77 and the flip-flop 76. The switches 78 and 80 are actuated by two separate surfaces on a cam which is shown schematically in Fig. 2. This cam 82 may conveniently be mechanically connected to the shaft 14 to be rotated thereby.

When the mirror assembly 11 is rotated, the cam 82 is rotated in a clockwise direction as is shown by the arrow 81. The cam marking 0° corresponds to the start of the scanning cycle or to the time $t_1$ shown in Fig. 5 and the cam marking A° corresponds to the end of the scanning cycle. The cam marking B° represents the position of the cam 82 at which the switch 80 is closed. This switch 80 is maintained closed by the cam 82 until the angular position of A° is reached or is closed during the interval from the angle B° to the angle A° going clockwise on the cam 82. At B° the cam opens the switch 80 and thereby disconnects the photocells 46 and 50 from the amplifier 75 and the flip-flop 76 respectively. The cam 82 is also adapted to actuate the reset pulse switch 78 at a predetermined time after the angle B° has been reached and before the time that the angle 0° is reached. This cam is arranged to momentarily close the switch 78 and then open this switch again to apply a positive pulse to the flip-flop 76 and the counter 77 some time during the time interval that the cam 82 is rotating in a clockwise direction between the poistions B° and 0°.

In operation the cam 82 closes the switch 80 at B° and at this same time light from the source 26 passes through a portion of the slot 61, reflects from the mirror 12 and strikes the photocell 55. This light striking the photocell 55 causes the photocell to conduct and thereby reduces the potential on the plate thereof to a potential level 79 which is shown in Fig. 5.

During the time interval that the cam 82 is rotating between B° and 0° the switch 78 is momentarily closed and a positive pulse is applied to reset the flip-flop 76 and the counter 77. When the angular position of 0° is reached, the scanning cycle starts and the lines 24 on the scale 23 are scanned by the photocell 46. While the cam 82 is rotating between 0° and B° the time $t_2$ occurs and the image of the point 31 is scanned. This results in a positive pulse being produced at the output of the photocell 55 which triggers the flip-flop 76 and thereby cuts off the amplifier 75. When the cam 82 reaches A° the scanning cycle is completed and the switch 80 is opened to disconnect the photocells 46 and 55 from the gated amplifier 75 and the flip-flop 76 respectively. During the time interval that the cam 82 is rotating clockwise between A° and B° the graph paper is advanced in the direction shown by the arrow 85 in Fig. 1 through the desired interval along the abscissa by any suitable switch mechanism or by hand.

There has thus been disclosed a new and novel apparatus for electronically producing an accurate digital representation of the ordinate of a curve at any desired abscissa. Possible modifications of the present invention may include the use of a reflected rather than a transmitted light beam for reading curve 60 and for scale 23. This could be attained by modifying only the manner of illumination. It is also possible to make the distance from scale 23 to the axis of shaft 14 much larger than that from the axis to graph paper 34. This modification will permit smaller quantization errors in the outputs to be realized in relation to the spacing of lines 24. Furthermore, by adjusting the distance from scale 23 to the axis of shaft 14 the output scale factor might be varied arbitrarily.

This invention is also capable of reading graphs plotted in a coordinate system whose axis of ordinates is curved, such as is produced by certain types of automatic curve plotting machines. This is attained by making slit 61 curved in the same manner as the axis of the ordinates.

By making the spacing of lines 24 on member 23 nonuniform, for example, logarithmic, an arbitrary function of the ordinate of graph 60 may be generated as the output, rather than the ordinate itself.

By replacing the scale 23 by a second piece of graph paper on which are plotted contours of constant values of a function, it would be possible to generate a digital output corresponding to the value of this function.

If the device is modified by omitting flip-flop 76 and using the output of photocell 55 to gate amplifier 75 directly, it would be suitable for reading bar graphs such as one produced, for example, by some photographic telemetering records. This may also be combined with a function generator.

What is claimed as new is:

1. A system for producing a digital representation of the ordinate of a curve disposed on a graph plotted with respect to an abscissa, said system including the combination of: first means including a first light source for sweeping a first beam of light parallel to the ordinate axis of a portion of the curve to scan a selected portion of said curve; second means including a second light source for sweeping a second beam of light parallel to the ordinate axis of said portion of said curve; third means for periodically interrupting the light received from said second means in synchronism with the scanning of said curve by said first beam of light; fourth means including gating means for converting the light interrupted by said third means into electrical signals and selectively translating said signals, and means including means sensitive to said first beam of light after being modulated by said curve for controlling said gating means in accordance with the ordinate on said curve, whereby a signal is produced representative of the digital value corresponding to said ordinate on said curve.

2. The system defined in claim 1 wherein said fourth means including a first photoelectric cell and an amplifier adapted to be gated operative and inoperative coupled to the output of said first photoelectric cell; and said means sensitive to said first beam of light after scanning said graph for controlling said gating means includes a second photoelectric cell and a flip-flop coupled to the output of said second photoelectric cell, the output of said flip-flop being coupled to said amplifier.

3. A system for producing a digital representation of the ordinate of a curve disposed on a graph plotted with respect to an abscissa, said system including the combination of: a first source of illumination; a second source of illumination; rotatable means arranged to reflect light received from said sources of illumination; a first aperture disposed between said first source of illumination and said rotatable means; a translucent member positioned in said aperture and having a series of spaced opaque lines disposed thereon; a second narrow aperture positioned between said second source of illumination and said rotatable means; a first photoelectric cell responsive to light from said translucent member reflected by said rotatable means; a second photoelectric cell responsive to light through said second aperture reflected by said rotatable means and means controlled by said first photoelectric cell for selectively deriving an output signal from said second photoelectric cell, whereby when said graph is placed upon said second aperture with its ordinate axis parallel to said second aperture, an electric signal is produced representative of the digital value corresponding to said ordinate on said curve.

4. A system for producing a digital representation of the ordinate of a curve disposed on a graph plotted with respect to an abscissa, said system including the combination of: a first source of illumination; a second source of illumination; rotatable means arranged to reflect light received from said sources of illumination; an opaque enclosure substantially enclosing each of said sources of illumination and substantially enclosing said rotatable means; a first aperture disposed between said first source of illumination and said rotatable means; a first translucent member positioned in said aperture and having a series of spaced opaque lines disposed thereon; a second narrow aperture disposed between said second source of illumination and said rotatable means; a second translucent member positioned in said second aperture; an opaque shield having a transverse slotted aperture therein, said shield being positioned over and completely covering said second translucent member and adapted to hold said graph against said second translucent member; a first photocell responsive to light through said first translucent member reflected by said rotatable means; a second photocell responsive to light through said second aperture reflected by said rotatable means; and means including said first and second photoelectric cells for establishing electrical impulses for an increment of time corresponding to the ordinate of selected points in said curve, whereby when said graph is placed upon said second translucent member with its ordinate axis parallel to said slot, a signal is produced representative of the digital value corresponding to said ordinate on said curve.

5. The system described in claim 4 wherein said rotatable means includes a two-sided optical mirror rotatable about a fixed axis.

6. A system for producing a digital representation of the ordinate of a curve disposed on a graph plotted with respect to an abscissa, said system including the combination of: a first source of illumination; a second source of illumination; rotatable means arranged to reflect light received from said first and said second sources of illumination; first and second opaque enclosures substantially enclosing each of said sources of illumination; a third opaque enclosure intermediate said first and second enclosures and substantially enclosing said rotatable means; a first aperture disposed between said first source of illumination and said rotatable means and in said first and third enclosures; a first translucent member positioned in said first aperture, said first translucent member having a series of spaced opaque lines disposed thereon; a second aperture disposed between said second source of illumination and said rotatable means and in said second and third enclosures; a second translucent member positioned in said second aperture; an opaque shield having a transverse slotted aperture therein, said shield being positioned over and completely covering said second translucent member and adapted to hold said graph against said second translucent member; a first photoelectric cell responsive to light from said first translucent member reflected by said rotatable means; a second photoelectric cell responsive to light from said second translucent member passing through said slot which is coincident with a given absicssa on said curve reflected by said rotatable means; counting means adapted to count the output signals of said first photoelectric cell, means for controlling the actuation of said counting means including means for starting actuation of said counting means at a predetermined point of travel of said rotatable means and means for stopping actuation of said counting means when an output signal is developed by said second photoelectric cell, whereby a signal is developed in said counting means representative of the digital value corresponding to said ordinate on said curve.

7. The system defined in claim 6 and including fourth and fifth opaque enclosures to substantially enclose said first and second photoelectric cells; a third transverse slotted aperture positioned between said rotatable means and said first photoelectric cell and in said third and fourth enclosures to admit light into said fourth enclosure; and a fourth transverse slotted aperture positioned between said rotatable means and said second photoelectric cell and in said third and fifth enclosures to admit light into said fifth enclosure.

References Cited in the file of this patent
UNITED STATES PATENTS

| | | |
|---|---|---|
| 2,199,769 | Woolley | May 7, 1940 |
| 2,360,883 | Metcalf | Oct. 24, 1944 |
| 2,393,186 | Potter | Jan. 15, 1946 |
| 2,624,848 | Hancock et al. | Jan. 6, 1953 |
| 2,635,195 | Hancock | Apr. 14, 1953 |
| 2,717,987 | Hagen | Sept. 13, 1955 |
| 2,765,211 | Brinster et al. | Oct. 2, 1956 |